US006978224B2

(12) United States Patent
Gopal

(10) Patent No.: US 6,978,224 B2
(45) Date of Patent: Dec. 20, 2005

(54) ALARM RECOVERY SYSTEM AND METHOD FOR FUEL CELL TESTING SYSTEMS

(75) Inventor: Ravi B. Gopal, Mississauga (CA)

(73) Assignee: Hydrogenics Corporation, Mississauga (CA)

( * ) Notice: Subject to any disclaimer, the term of this patent is extended or adjusted under 35 U.S.C. 154(b) by 11 days.

(21) Appl. No.: 10/825,137

(22) Filed: Apr. 16, 2004

(65) Prior Publication Data

US 2004/0267467 A1 Dec. 30, 2004

Related U.S. Application Data

(63) Continuation-in-part of application No. 10/244,609, filed on Sep. 17, 2002, now Pat. No. 6,889,147.

(60) Provisional application No. 60/463,313, filed on Apr. 17, 2003.

(51) Int. Cl.[7] .............................................. G06F 19/00
(52) U.S. Cl. ...................................... 702/182; 702/63
(58) Field of Search .......................... 702/57, 63, 108, 702/113, 182; 429/12, 22, 26, 30, 36; 700/79, 700/80

(56) References Cited

U.S. PATENT DOCUMENTS

| | | | |
|---|---|---|---|
| 3,938,099 A | 2/1976 | Hyder | |
| 4,176,974 A | 12/1979 | Bishai et al. | |
| 4,680,710 A | 7/1987 | Kizilbash | |
| 4,695,977 A | 9/1987 | Hansen et al. | |
| 4,696,492 A | 9/1987 | Hardin | |
| 4,710,877 A | 12/1987 | Ahmed | |
| 4,747,127 A | 5/1988 | Hansen et al. | |
| 5,159,687 A | 10/1992 | Richburg | |
| 5,202,977 A | 4/1993 | Pasetes, Jr. et al. | |
| 5,228,123 A | 7/1993 | Heckel | |
| 5,313,527 A | 5/1994 | Guberman et al. | |
| 5,377,280 A | 12/1994 | Nakayama | |
| 5,388,993 A | 2/1995 | McKiel et al. | |
| 5,404,528 A | 4/1995 | Mahajan | |
| 5,410,681 A | 4/1995 | Jessen et al. | |
| 5,425,110 A | 6/1995 | Spitz | |
| 5,428,525 A | 6/1995 | Cappelaere et al. | |
| 5,450,470 A | 9/1995 | Alheim | |
| 5,467,407 A | 11/1995 | Guberman et al. | |
| 5,479,487 A | 12/1995 | Hammond | |
| 5,496,740 A | 3/1996 | Williams | |
| 5,512,831 A | 4/1996 | Cisar et al. | |
| 5,555,346 A | 9/1996 | Gross et al. | |
| 5,572,668 A | 11/1996 | See et al. | |
| 5,594,791 A | 1/1997 | Szlam et al. | |
| 5,600,579 A | 2/1997 | Steinmetz, Jr. | |
| 5,600,789 A | 2/1997 | Parker et al. | |

(Continued)

FOREIGN PATENT DOCUMENTS

WO    WO 01/43216    6/2001

*Primary Examiner*—Bryan Bui
(74) *Attorney, Agent, or Firm*—Bereskin & Parr

(57) ABSTRACT

Some embodiments of the present invention provide a system and method that incorporates a call to an alarm recovery sequence into a safety system for use within a fuel cell testing system. In other embodiments of the present invention there is provided a safety system and method, for use within a fuel cell testing system, which is able to suspend a fuel cell testing trail and initiate an alarm recovery sequence upon detecting that a corresponding alarm threshold has been violated. The safety system and method is then able to restart the trail if it is determined that the alarm recovery sequence was successful, in that the process and operating parameters that violated the particular alarm threshold have been brought back to within a safe operating range.

23 Claims, 5 Drawing Sheets

U.S. PATENT DOCUMENTS

| | | |
|---|---|---|
| 5,604,896 A | 2/1997 | Duxbury et al. |
| 5,623,657 A | 4/1997 | Conner et al. |
| 5,634,086 A | 5/1997 | Rtischev et al. |
| 5,664,087 A | 9/1997 | Tani et al. |
| 5,666,543 A | 9/1997 | Gartland |
| 5,669,000 A | 9/1997 | Jessen et al. |
| 5,683,829 A | 11/1997 | Sarangapani |
| 5,692,198 A | 11/1997 | Ushiku |
| 5,721,770 A | 2/1998 | Kohler |
| 5,734,837 A | 3/1998 | Flores et al. |
| 5,739,869 A | 4/1998 | Markle et al. |
| 5,745,738 A | 4/1998 | Ricard |
| 5,754,755 A | 5/1998 | Smith, Jr. |
| 5,781,720 A | 7/1998 | Parker et al. |
| 5,810,284 A | 9/1998 | Hibbs et al. |
| 5,822,543 A | 10/1998 | Dunn et al. |
| 5,826,088 A | 10/1998 | Sitbon et al. |
| 5,848,273 A | 12/1998 | Fontana et al. |
| 5,848,352 A | 12/1998 | Dougherty et al. |
| 5,852,825 A | 12/1998 | Winslow |
| 5,854,927 A | 12/1998 | Gelissen |
| 5,854,930 A | 12/1998 | McLain, Jr. et al. |
| 5,884,309 A | 3/1999 | Vanechanos, Jr. |
| 5,889,950 A | 3/1999 | Kuzma |
| 5,896,494 A | 4/1999 | Perugini et al. |
| 5,916,705 A | 6/1999 | Carter et al. |
| 5,929,319 A | 7/1999 | King et al. |
| 5,933,525 A | 8/1999 | Makhoul et al. |
| 5,944,784 A | 8/1999 | Simonoff et al. |
| 5,954,829 A | 9/1999 | McLain, Jr. et al. |
| 5,956,709 A | 9/1999 | Xue |
| 5,963,635 A | 10/1999 | Szlam et al. |
| 5,963,934 A | 10/1999 | Cochrane et al. |
| 5,969,715 A | 10/1999 | Dougherty et al. |
| 5,969,835 A | 10/1999 | Kamieniecki et al. |
| 5,978,594 A | 11/1999 | Bonnell et al. |
| 5,978,834 A | 11/1999 | Simonoff et al. |
| 5,980,090 A | 11/1999 | Royal, Jr. et al. |
| 5,987,251 A | 11/1999 | Crockett et al. |
| 5,991,897 A | 11/1999 | Perugini et al. |
| 6,002,868 A | 12/1999 | Jenkins et al. |
| 6,005,568 A | 12/1999 | Simonoff et al. |
| 6,006,035 A | 12/1999 | Nabahi |
| 6,014,517 A | 1/2000 | Shagam et al. |
| 6,030,718 A | 2/2000 | Fuglevand et al. |
| 6,035,119 A | 3/2000 | Massena et al. |
| 6,035,264 A | 3/2000 | Donaldson et al. |
| 6,061,727 A | 5/2000 | Simonoff et al. |
| 6,072,503 A | 6/2000 | Tani et al. |
| 6,072,944 A | 6/2000 | Robinson |
| 6,075,528 A | 6/2000 | Curtis |
| 6,078,321 A | 6/2000 | Simonoff et al. |
| 6,078,322 A | 6/2000 | Simonoff et al. |
| 6,078,743 A | 6/2000 | Apte et al. |
| 6,094,673 A | 7/2000 | Dilip et al. |
| 6,096,449 A | 8/2000 | Fuglevand et al. |
| 6,125,387 A | 9/2000 | Simonoff et al. |
| 6,129,895 A | 10/2000 | Edmondson |
| 6,151,610 A | 11/2000 | Senn et al. |
| 6,151,703 A | 11/2000 | Crelier |
| 6,163,796 A | 12/2000 | Yokomizo |
| 6,167,448 A | 12/2000 | Hemphill et al. |
| 6,167,534 A | 12/2000 | Straathof et al. |
| 6,173,437 B1 | 1/2001 | Polcyn |
| 6,182,093 B1 | 1/2001 | Hagenaars |
| 6,188,401 B1 | 2/2001 | Peyer |
| 6,202,201 B1 | 3/2001 | Domi |
| 6,218,035 B1 | 4/2001 | Fuglevand et al. |
| 6,222,538 B1 | 4/2001 | Anderson |
| 6,223,190 B1 | 4/2001 | Aihara et al. |
| 6,224,746 B1 | 5/2001 | Meissner et al. |
| 6,256,772 B1 | 7/2001 | Apte et al. |
| 6,263,344 B1 | 7/2001 | Wu et al. |
| 6,263,352 B1 | 7/2001 | Cohen |
| 6,266,681 B1 | 7/2001 | Guthrie |
| 6,266,811 B1 | 7/2001 | Nabahi |
| 6,269,337 B1 | 7/2001 | Desmond et al. |
| 6,273,725 B1 | 8/2001 | Bernstein et al. |
| 6,275,868 B1 | 8/2001 | Fraley et al. |
| 6,282,699 B1 | 8/2001 | Zhang et al. |
| 6,285,380 B1 | 9/2001 | Perlin et al. |
| 6,286,033 B1 | 9/2001 | Kishinsky et al. |
| 6,295,531 B1 | 9/2001 | Bae et al. |
| 6,301,703 B1 | 10/2001 | Shank et al. |
| 6,311,320 B1 | 10/2001 | Jibbe |
| 6,324,042 B1 | 11/2001 | Andrews |
| 6,332,217 B1 | 12/2001 | Hastings |
| 6,336,072 B1 | 1/2002 | Takayama et al. |
| 6,343,362 B1 | 1/2002 | Ptacek et al. |
| 6,348,279 B1 | 2/2002 | Saito et al. |
| 6,353,923 B1 | 3/2002 | Bogle et al. |
| 6,356,867 B1 | 3/2002 | Gabai et al. |
| 6,383,670 B1 | 5/2002 | Edlund et al. |
| 6,387,556 B1 | 5/2002 | Fuglevand et al. |
| 6,428,918 B1 | 8/2002 | Fuglevand et al. |
| 6,461,751 B1 | 10/2002 | Boehm et al. |
| 2002/0197522 A1 * | 12/2002 | Lawrence et al. ............ 429/34 |
| 2004/0175598 A1 * | 9/2004 | Bliven et al. ................ 429/12 |

* cited by examiner

ALARM RECOVERY SYSTEM AND METHOD FOR FUEL CELL TESTING SYSTEMS

PRIORITY CLAIM

This application is a continuation-in-part of U.S. application Ser. No. 10/244,609 (filed on Sep. 17, 2002) now U.S. Pat. No. 6,889,147, the entire contents of which are hereby incorporated by reference. Furthermore, a priority claim is made to U.S. Provisional Application No. 60/463,313 (filed on Apr. 17, 2003), the entire contents of which are also hereby incorporated by reference.

FIELD OF THE INVENTION

The invention relates to fuel cell testing systems, and, in particular to an alarm recovery system and method for fuel cell testing systems.

BACKGROUND OF THE INVENTION

Fuel cells convert chemical energy of fuels into electricity. In some types of fuel cells hydrogen and an oxidant are used as the basic fuels in a set of complementary chemical reactions yielding electricity as one product. Theoretically, the only products of such reactions are electricity, heat and water. In reality, a number of practical factors affect the efficiency of the reactions, and, as a consequence, other undesirable by-products are also produced.

The development of a fuel cell requires rigorous testing to ensure that all of the reaction products produced can be predictably regulated during the foreseen operation of the fuel cell. Several testing systems have been developed for this purpose. An exemplary testing system is provided in U.S. application Ser. No. 10/244,609, which was incorporated by reference above. This testing system can be used to carry out trials during which process and operating parameters for a fuel cell are purposefully varied to mirror foreseen use and abuse.

A long-term trial may be stopped short due to breached alarm thresholds built into a testing system's safety controls. If one of the alarm thresholds is crossed during a trial a safety control mechanism included in the testing system may act to terminate the trial, even though corrective action may reverse alarm conditions in some scenarios. Such stoppages can severely slow down progress during the development of a fuel cell design and/or other systems concurrently being deigned to co-operate with it.

SUMMARY OF THE INVENTION

According to an aspect of an embodiment of the invention there is provided an fuel cell testing system having: a safety system for monitoring at least one process and operating parameter during a fuel cell testing trial and evaluating whether at least one alarm threshold has been violated by the at least one process and operating parameter; a computer usable medium having computer readable code means embodied therein for causing the safety system to suspend the fuel cell testing trial when said at least one alarm threshold has been violated and subsequently to initiate a corresponding alarm recovery sequence for a violated alarm threshold; and instructions for recording and evaluating measured process and operating parameters in order to determine whether said at least one alarm threshold has been violated.

According to another aspect of the invention there is provided a method of controlling a fuel cell testing trial having the steps of: measuring at least one process and operating parameter of a fuel cell under test; evaluating the at least one process and operating parameter to determine whether at least one alarm threshold has been violated by said at least one process and operating parameter; suspending the fuel cell testing trial if at least one alarm threshold has been violated; and initiating an alarm recovery sequence.

Other aspects and features of the present invention will become apparent, to those ordinarily skilled in the art, upon review of the following description of the specific embodiments of the invention.

BRIEF DESCRIPTION OF THE DRAWINGS

Preferred embodiments of the invention will now be described with reference to the attached drawings in which.

DETAILED DESCRIPTION OF THE INVENTION

Shutting down a fuel cell testing system during a trial may, in some instances, be unnecessary and corrective action may be possible to bring the process and operating parameters, which violated a particular alarm threshold, back to within a safe operating range. A trail may be either a fuel cell test condition that is allowed to run steady state or it may be an automation test sequence that puts the fuel cell through a programmed set of operating conditions. In some embodiments of the invention there is provided a modified safety system that can interrupt and suspend a trial when an alarm threshold has been violated and initiate a corresponding alarm recovery sequence to bring a fuel cell under test and/or the fuel cell testing system back to within a safe operating range. In some embodiments, if the modified safety system determines that the alarm recovery sequence was not effective, emergency shutdown of the testing system is initiated. In other embodiments, further alarm recovery sequences may be initiated before emergency shutdown of the testing system is commenced. On the other hand, in some embodiments, the suspended trial is restarted if the alarm recovery sequence was deemed to be effective. The present invention in some embodiments is equally applicable to fuel cell module and fuel cell system testing as it is to fuel cell stack testing.

Fuel cells are commonly connected in series to form a fuel cell stack. The fuel cell stack provides a larger electric potential than a single fuel cell; and since the fuel cell stack effectively operates as one unit, a cooperative design for supporting systems and instrumentation required by the constituent fuel cells is possible. A fuel cell stack is typically enclosed in a single housing that is designed to include connections for piping, sensors, regulators (e.g. for temperature, pressure, relative-humidity, flow rate of fuels and coolant, etc.), and other instrumentation used to support the operation of the fuel cell stack. The fuel cell stack, housing, and associated combination of hardware, software and firmware make up a fuel cell module.

Figure 1:
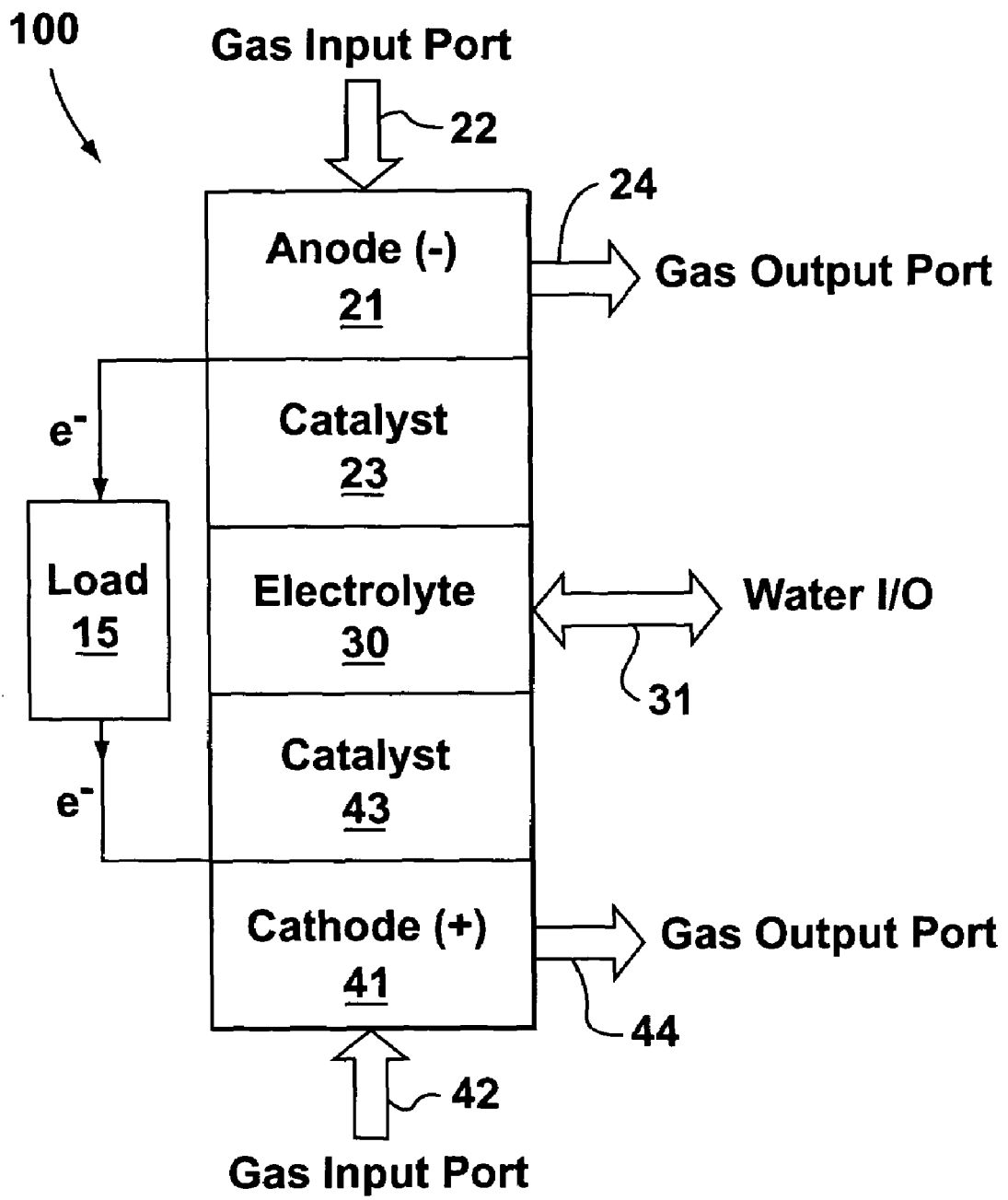
FIG. 1 is a simplified schematic drawing of a fuel cell module.

Referring to FIG. 1, shown is a simplified schematic drawing of a fuel cell module 100 that will be described herein to illustrate some general considerations relating to the testing of fuel cell modules. It is to be understood that the present invention is applicable to the testing of various configurations of fuel cell modules that would each include a suitable combination of supporting systems, instrumentation, hardware, software, firmware and structural elements.

As is known, there are a wide variety of different fuel cell technologies, and in general, this invention is expected to be applicable to any type of fuel cell, including alkaline, direct methanol, molten carbonate, phosphoric acid and solid oxide fuel cells. However, the invention has been developed for use with PEM (Proton Exchange Membrane) fuel cells, and is described in relation to a PEM fuel cell stack powered by hydrogen.

The fuel cell module 100 has an anode 21 and a cathode 41. The anode 21 has a gas input port 22 and a gas output port 24. Similarly, the cathode 41 has a gas input port 42 and a gas output port 44. The fuel cell 100 also includes a water Input/Output (I/O) port 31 through which water can be supplied to and/or removed from the fuel cell module 100, and commonly is supplied to humidifiers (not shown) for the incoming gas streams. The fuel cell module 100 also includes a first catalyst 23 in close proximity to the anode 21, a second catalyst 43 in close proximity to the cathode 41, and an electrolyte 30 between the anode 21 and the cathode 41. Also shown in FIG. 1 is a load 15 coupled between the anode 21 and the cathode 41.

As noted above, a fuel cell is an electrochemical device that generates electricity from stored chemical energy in the fuels employed. Referring again to the fuel cell module 100, illustrated in FIG. 1, hydrogen is introduced into the anode 21 via the gas input port 22 under some predetermined conditions. Examples of the predetermined conditions may include factors such as flow rate, temperature, pressure, relative humidity and a mixture of the hydrogen with other gases. The hydrogen reacts electrochemically according to equation (1), given below, in the presence of the electrolyte 30 and the first catalyst 23.

$$H_2 \rightarrow 2H^+ + 2e^- \qquad (1)$$

The products of equation (1) are hydrogen ions and electrons. The hydrogen ions pass through the electrolyte 30 to the cathode 41 while the electrons are drawn through the load 15. Un-reacted hydrogen and other gases are drawn out through gas output port 24.

Simultaneously (to the reactions in the anode 21 described above) an oxidant, such as air, is introduced into the cathode 41 via the gas input port 42 under some predetermined conditions. Examples of the predetermined conditions may again include factors such as flow rate, temperature, pressure, relative humidity and a mixture of the oxidant with other gases. The oxidant reacts electrochemically according to equation (2), given below, in the presence of the electrolyte 30 and the second catalyst 43.

$$1/2 O_2 + 2H^+ + 2e^- \rightarrow H_2O \qquad (2)$$

It can be noted from equation (2), that the electrons and the ionized hydrogen atoms, produced in equation (1) at the anode 21, are consumed in the reaction at the cathode 41. Excess gases, including un-reacted oxidant, and the generated water are drawn out of the cathode 41 through gas output port 44.

Generally, as mentioned above, other gases may be introduced into the anode and the cathode to mix with the hydrogen and oxidant, respectively. These other gases help to regulate the aforementioned electrochemical reactions and suppress any side reactions that may occur due to impurities and inefficiencies within a fuel cell module. Also, the addition of other gases would allow testing of the fuel cells under non-ideal conditions of reactant purity. Examples of other gases introduced into the anode may include, but are not limited to, steam, methane, carbon monoxide, carbon dioxide, nitrogen and air. Similarly, examples of other gases introduced into the cathode may include, but are not limited to, steam, nitrogen, air, and helox.

The process and operating parameters (such as temperature, internal pressures, electrical outputs, etc.) of a fuel cell module are closely monitored and regulated. Operating parameters of particular interest include a voltage across each fuel cell in a fuel cell stack, commonly referred to as cell voltage, and an internal resistance of each fuel cell. Moreover, the process gases have to be delivered to a fuel cell module at respective flow rates and each having a corresponding temperature, pressure and relative humidity. The reaction products have to be removed from the fuel cell module. Monitoring and regulating all of these parameters ensures preferable performance of the fuel cell module for a given output demand required by a particular load. Thus, during the testing of a fuel cell module a number of the aforementioned process and operating parameters are varied and outputs are monitored to evaluate the performance the fuel cell module under different conditions, so that the preferable settings for the process and operating parameters can be ascertained for different loading conditions.

An embodiment of a fuel cell testing system disclosed in U.S. application Ser. No. 10/244,609 advantageously enables the use of user defined application programs (i.e. user applications or application programs) to automate the control of a fuel cell testing trial. The testing system, in some embodiments, incorporates a micro-controller (or micro-computer) that executes test instructions or test vectors in the user application(s), while simultaneously running a safety system. The role of the safety system is to monitor the process and operating parameters and initiate an emergency shutdown of the testing system if one of a number of pre-programmed alarm thresholds is crossed during a trial. For example, emergency shutdown may occur if the operating temperature of the fuel cell module becomes exceedingly high due to an increased reaction rate caused by an oversupply of fuels into the anode(s) and/or cathode(s) of the constituent fuel cell(s).

Violation of an alarm threshold during a trial is generally not predictable and one purpose of the testing process is to discover unknown design faults so that they may be corrected. In view of these factors and the rapid progress being made in this field, testing of a new fuel cell module design typically required a conservative approach so that a fuel cell module and/or a testing system was not damaged during a trail. Consequently, the testing of a new fuel cell module design had to be carried out with non-optimized monitoring and regulating computer control.

Some embodiments of the present invention provide a system and method that incorporates a call to an alarm recovery sequence into a safety system for use within a fuel cell testing system. In other embodiments of the present invention there is provided a safety system and method, for use within a fuel cell testing system, which is able to suspend a (fuel cell testing) trial and initiate an alarm recovery sequence upon detecting that a corresponding alarm threshold has been violated. The safety system and method is then able to restart the trial if it is determined that the alarm recovery sequence was effective, in that the process and operating parameters that violated the particular alarm threshold(s) have been brought back to within a safe operating range. Various embodiments of the present invention may be advantageously integrated into various embodiments of the testing system disclosed in U.S. application Ser. No. 10/244,609.

Figure 2:
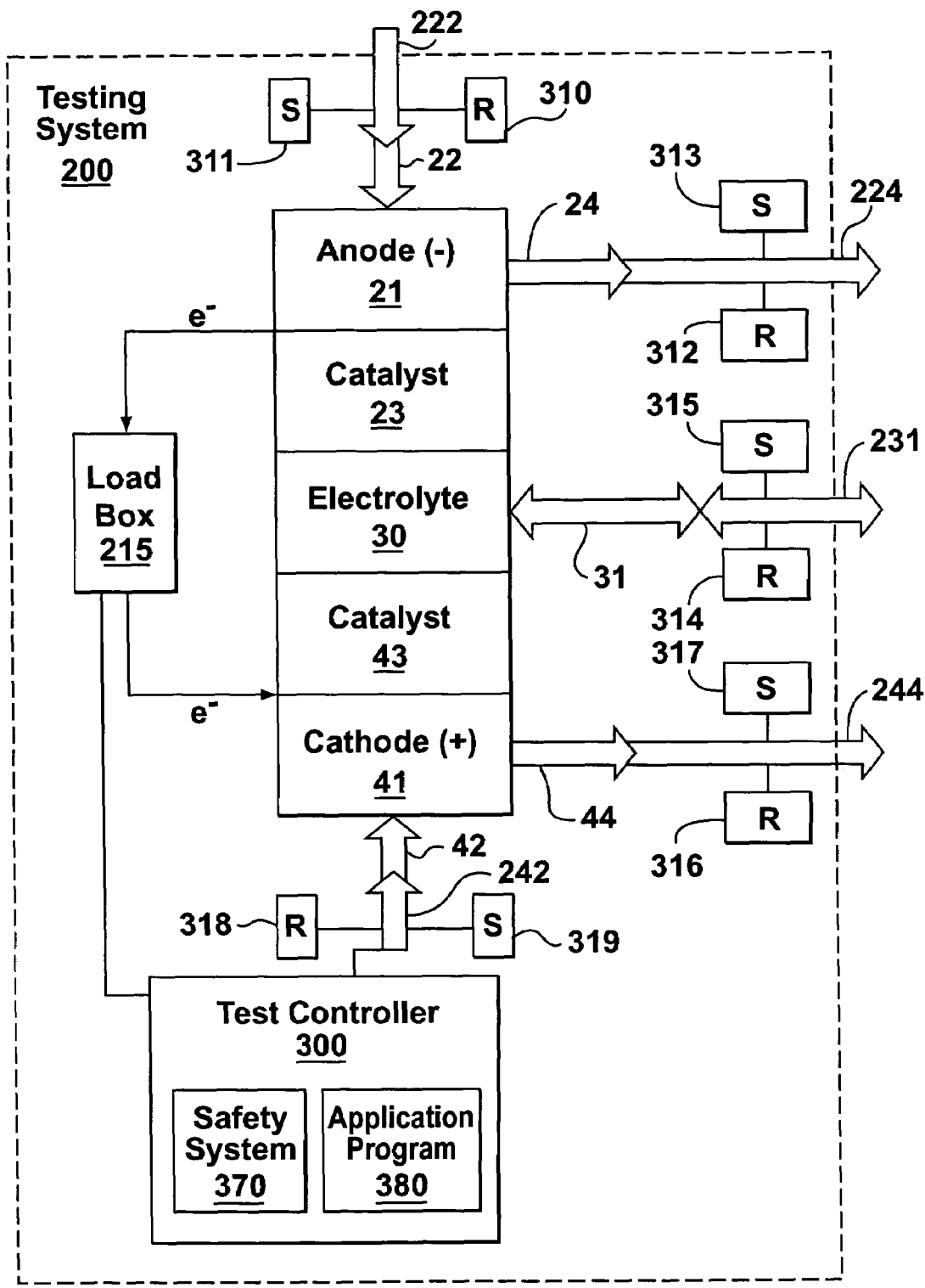
FIG. 2 is a simplified schematic drawing of a fuel cell testing system in combination with the fuel cell module shown in FIG. 1.

Referring now to FIG. 2, shown is a schematic drawing of a simplified fuel cell testing system 200 coupled to the fuel cell module 100 (illustrated in FIG. 1). The testing system 200 shown in FIG. 2 includes some basic features found in a practical fuel cell testing system. Those skilled in the art would appreciate that a practical testing system also includes a suitable combination of sensors, regulators (e.g. for temperature, pressure, humidity and flow rate control), control lines and supporting apparatus/instrumentation in addition to a suitable combination of hardware, software and firmware. Furthermore, it is also to be understood that the description provided herein, relating to the simplified testing system 200, is by no means meant to restrict the scope of the claims following this section. Again, this testing system is configured for a PEM-type fuel cell, and the sensors, regulators, etc. would need to be varied for other types of fuel cells.

The testing system 200 includes a test controller 300 that is used to manage fuel cell testing by a skilled operator. In some embodiments the test controller 300 is made up of a single server or computer having at least one microcomputer; and, in other embodiments the test controller 300 is made up of a combination of microcomputers appropriately configured to divide the tasks associated with fuel cell testing amongst the combination of microcomputers.

In some embodiments the test controller 300 is made up of a computer usable medium having a computer readable code means, a modified safety system 370 and at least one application program 380. In the present embodiment of the invention the test controller 300 includes a memory device (not shown) storing a computer readable code means having instructions for the modified safety system 370 and the at least one application program 380. The modified safety system 370, in accordance with an embodiment of the invention, is capable of calling an alarm recovery sequence in the event that a corresponding alarm threshold has been violated. The at least one application program 380 contains user designed test vectors for varying the process and operating parameters of a fuel cell module under test. In some embodiments, application programs are made up of computer readable codes means having data and instructions for executing a sequence of test vectors defining a trial.

The testing system 200 also includes a number of physical connections to ports of the fuel cell module 100 that are used to supply required gases and vent exhaust and un-used gases from the fuel cell module 100. The physical connections include gas supply ports 222 and 242, gas exhaust ports 224 and 244 and a water supply exchange port 231. The gas supply ports 222 and 242 are coupled to the gas input ports 22 and 42 of the fuel cell module 100, respectively. The gas exhaust ports 224 and 244 are coupled to gas output ports 24 and 44 of the fuel cell module 100, respectively. The water supply exchange port 231 is coupled to the water I/O port 31 of the fuel cell module 100.

Additionally, there are a number of sensor connections between the testing system 200 and the fuel cell module 100. The sensor connections are advantageously used to monitor reaction products and electrical outputs produced by the fuel cell module 100 as well as other process and operating parameters. In the present embodiment, the testing system 200 includes sensors 311, 313, 315, 317 and 319 that are connected to ports 222, 224, 231, 244 and 242 (of the fuel cell module 100), respectively. The sensors 311, 313, 315, 317 and 319, may be used, for example, to monitor one or more of temperature, pressure, composition and relative humidity of input and output gases or fluid flows through any of the ports 222, 224, 231, 244 and 242.

The test controller 300 is also electrically connected to the regulators 310, 312, 314, 316 and 318 that are used to regulate process and operating parameters associated with ports 222, 224, 231, 244 and 242, respectively.

Moreover, within the context of the testing system 200, the load 15 shown in FIG. 1, has been replaced by a loadbox 215. The voltage and current drawn by the loadbox 215 is controllable so that different loading conditions can be imposed on the fuel cell module 100 during testing.

In operation the test controller 300 executes test vectors provided in the at least one application program 380. This is done by extracting the test vectors from the at least one application program 380 and, in turn, varying the loading conditions provided by the loadbox 215 and/or other process and operating parameters in accordance with the test vectors provided. The later is accomplished by having the test controller 300 transmit control signals to the regulators 310, 312, 314, 316 and 318. The test controller 300 then receives measurements related to the reaction products, electrical outputs and/or other process and operating parameters from the sensors 311, 313, 315, 317 and 319. The measurements can be recorded and evaluated.

During the testing process (i.e. a trial) alarm thresholds may be violated. Subsequently the testing process may unnecessarily be stopped short of completion by a safety system included in a testing system, such as the testing system 200. However, as noted above, embodiments of the present invention provide an alarm recovery system and method that can be automatically employed during a trial when an alarm threshold is violated.

Figure 3:
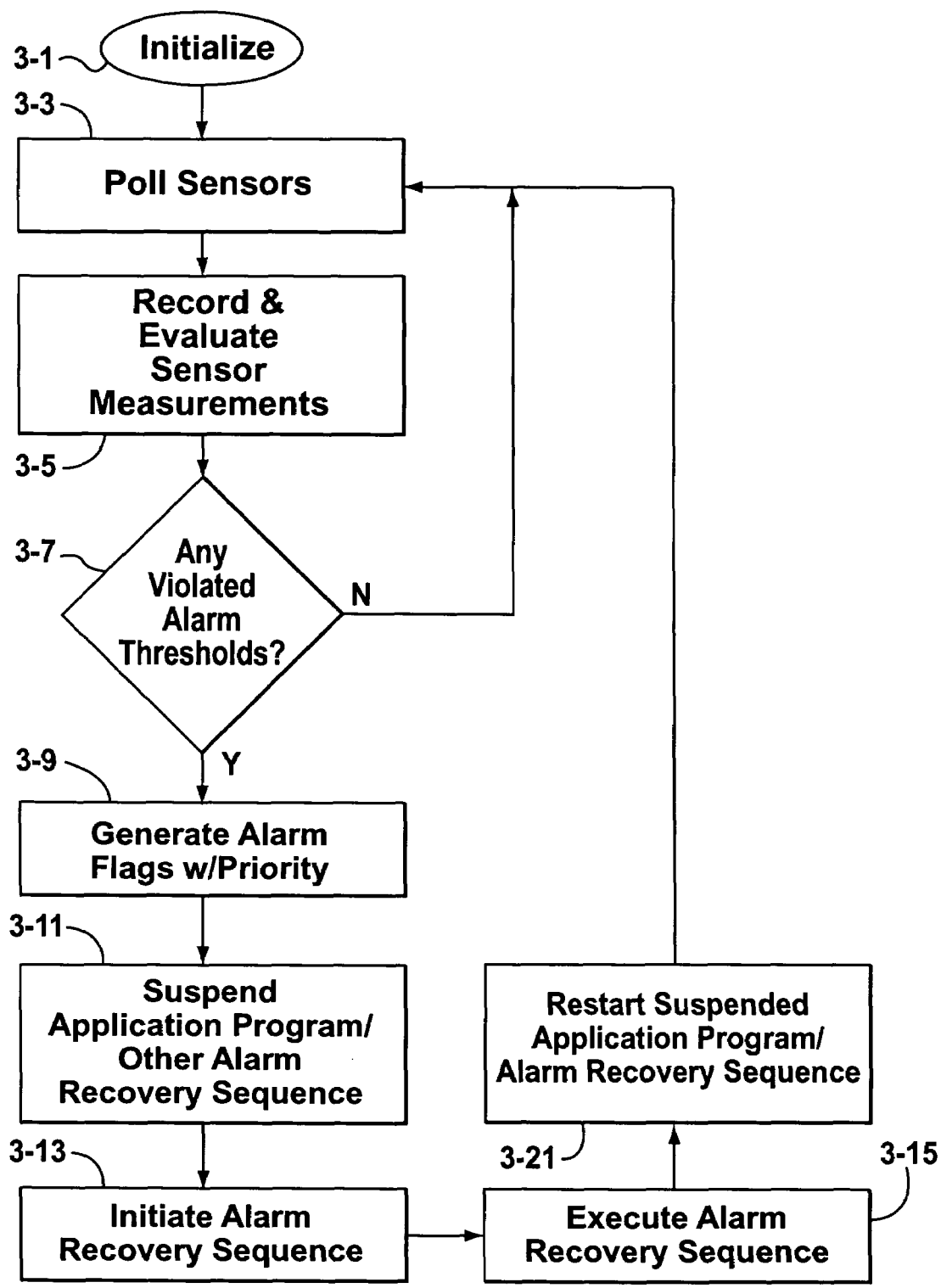
FIG. 3 is a flow chart depicting the general steps provided in a first modified safety program according to one embodiment of the invention.

Referring now to FIG. 3, illustrated is a flow chart depicting the general steps provided in a first modified safety system according to one embodiment of the invention, and hereinafter simply referred to as the safety system. The safety system operates to monitor whether or not any of a number of alarm thresholds is violated during a trial, and if there is an alarm threshold violation the safety system responds as described below. The alarm thresholds at least partially define a safe operating range for the fuel cell and fuel cell testing system during a particular trial. The violation of an alarm threshold involves the measurement of one or more process and operating parameters, which are in turn appropriately considered by the safety system.

Starting at step 3-1, the modified safety system is initialized when a fuel cell testing system is set-up to carryout trials on a fuel cell module. At such a point sensors and regulators associated with the testing system are calibrated and checked and the fuel cell module itself is connected to the testing system. A trial begins with the execution of at least one application program (i.e. user defined application) having instructions for varying the process and operating parameters associated with a fuel cell module. The safety system continuously or intermittently runs during the course of the trial. In some embodiments the safety system, described herein with reference to FIG. 3, includes a computer readable code means having instructions for monitoring, evaluating, interrupting and calling an alarm recovery sequence for a respective violated alarm threshold.

At step 3-3, the safety system polls sensors connected to the fuel cell module thereby measuring process and operating parameters. Any parameter that can be measured that will in turn provide information leading to an indication of how the fuel cell module is operating falls within the scope of parameters that may be measured by the sensors. For example, measurable process and operating parameters may include, but are not limited to, temperature of input and output gases, flow rates, reaction products and electrical outputs of the fuel cell module. Moreover, in some embodiments the safety system includes a computer readable code means having instructions for polling sensors to measure at least one process and operating parameter.

At step 3-5 the safety system records and evaluates the sensor readings of the measured process and operating parameters. In some embodiments a log is maintained for such records so that such data can be analyzed at a later time. Then, at step 3-7, the safety system determines whether or not any of the measured process and operating parameters has violated any of the alarm thresholds. In some embodiments the safety system includes a computer readable code means having instructions for recording and evaluating measured process and operating parameters.

If none of the alarms thresholds have been violated (no path, step 3-7), it is assumed that the trial is proceeding within the safe operating ranges defined for the trial. Subsequently, the safety system loops back to step 3-3. On the other hand, if one or more of the alarm thresholds have been violated (yes path, step 3-7) the safety system proceeds to step 3-9.

At step 3-9, the safety program suspends the application program carrying out the test vectors for the current trial, so that the process and operating parameters that have violated the alarm threshold(s) do not worsen. At step 3-11, the safety system generates an alarm flag for each alarm threshold that has been violated. Each alarm flag is assigned a priority based on its respective importance and/or how severe the damage caused by the alarm threshold violation might be if corrective action is not taken. One skilled in the art would appreciate that the order of steps 3-9 and 3-11 could be interchanged without departing from the scope of the present invention. Further, in some embodiments the safety system includes a computer readable code means for independently suspending an application program and/or generating priority sorted alarm flags for respective alarm thresholds that have been violated.

In other embodiments, the alarm flags are not assigned a priority and each alarm flag is dealt with in order of occurrence.

At step 3-13, the alarms flags are then processed in order of priority. That is, an alarm recovery sequence for the highest priority alarm flag is activated. The alarm recovery sequence is advantageously in the form of a user defined alarm script that is called by the safety system. The alarm script is, in some embodiments, in the form of a computer readable code means having instructions for carrying out the sequence steps that make up the alarm recovery sequence. A very specific example of an alarm script is provided below with respect to FIG. 5.

During step 3-15 the alarm recovery sequence is initiated by the safety system. The safety system continues to poll the sensors and monitor the process and operating parameters. That is, the execution of a alarm recovery sequence is treated the same as the execution of any other application program, which means that a particular alarm recovery sequence corresponding to an alarm flag with a respective priority may be interrupted and suspended if a higher priority alarm is generated by the safety system. This aspect of the invention will be discussed further with reference to the flow chart illustrated in FIG. 4.

After the alarm recovery sequence has finished, the safety system loops back to step 3-3 after restarting the suspended application program (or alarm recovery sequence) from where it was suspended in step 3-21. As described in the U.S. application Ser. No. 10/244,609, which was incorporated by reference above, the safety system continues to monitor the alarm thresholds, as a part of a separate subroutine (or sub-system), in order to enact a termination of the trial, which may still be necessary if the alarm recovery sequence was not effective.

In the present embodiment of the invention, it is assumed that the alarm recovery sequence may have also had a positive effect on some or all of the other alarm flags generated. So instead of processing the lower priority alarm flags found at step 3-7, the safety program loops back to step 3-3 to poll the sensors again to retrieve a current measurement of the process and operating parameters. However, in alternative embodiments the lower priority flags may be processed before returning to step 3-3. Moreover, the execution of an alarm recovery sequence may be interrupted if a higher priority alarm flag is generated.

Figure 4:
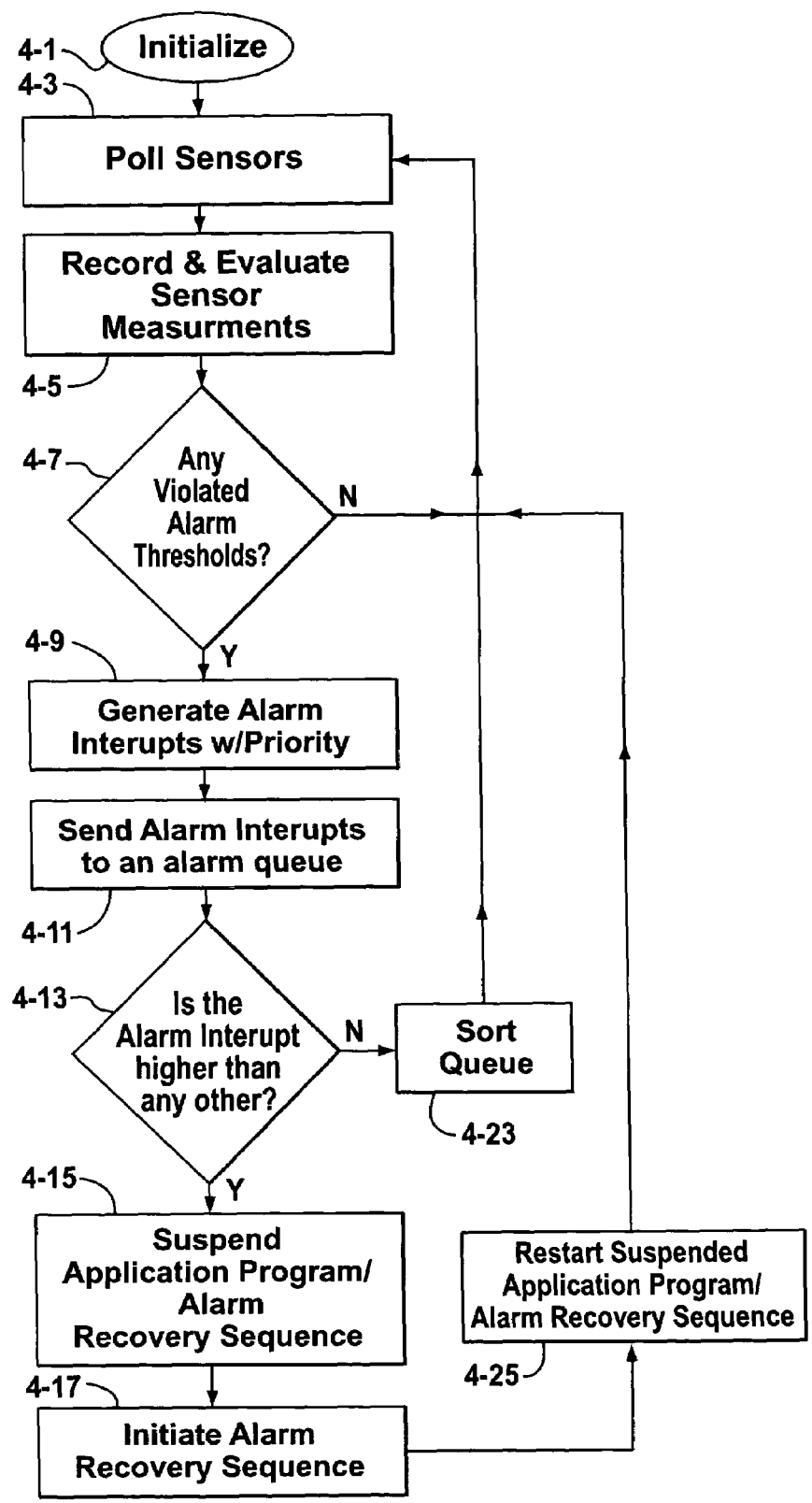
FIG. 4 is a flow chart depicting the general steps provided in a second modified safety program according to another embodiment of the invention.

Referring now to FIG. 4, illustrated is a flow chart depicting the general steps provided in a second modified safety system according to another embodiment of the invention, and hereinafter simply referred to as the safety system. This safety system has the same practical purpose as the safety system described with respect to FIG. 3. In fact, the steps 4-1 to 4-7 are the same as step 3-1 to 3-7, respectively.

Accordingly, at step 4-9, following from a positive indication at step 4-7 (yes path, step 4-7), the safety system generates at least one alarm interrupt with a respective priority in a similar manner to that which generated the alarm flags in step 3-9. In some embodiments the safety system includes a computer readable code means having instructions for generating alarm interrupts with respective priorities corresponding to respective alarm thresholds that have be violated.

Subsequently, at step 4-11 the at least one alarm interrupt is sent to an interrupt queue maintained and managed by the safety system. After the at least alarm interrupt is received into the interrupt queue the safety system, at step 4-13, determines whether or not the at least alarm interrupt has a priority that is higher than the highest interrupt in the queue. This would include a corresponding alarm interrupt for a respective alarm recovery sequence that is currently being executed. If the at least one alarm interrupt does not (no path, step 4-13) have a higher priority than any other alarm interrupt in the queue, the safety system proceeds to step 4-23, in which the interrupt queue is sorted into an order (i.e. ascending or descending) based on priority. Similar to what was noted above, in alternative embodiments, the alarm interrupts may not be assigned a priority, and in which case, the alarm interrupts would be processed in order of occurrence. The safety program then proceeds back to step 4-3. In some embodiments the safety system includes a computer readable codes means having instructions for maintaining and managing an interrupt queue as described herein. On the other hand, if the at least one alarm interrupt has the highest priority in the interrupt queue (yes path, step 4-13) the safety system proceeds to step 4-15.

At step 4-15 the currently executing application program or another alarm recovery sequence is suspended and a respective alarm recovery sequence corresponding to the at least one alarm interrupt is initiated by the safety program. After the respective alarm recovery sequence has finished executing, the safety system determines whether or not the process and operating parameters that resulted in the at least one alarm interrupt have changed to safer values. This process is similar to what was described above with respect to FIG. 3. Subsequently, the safety system proceeds to step 4-3 after restarting the suspended application program (or alarm recovery sequence) from where it was suspended in step 4-25.

Again, as described in the U.S. application Ser. No. 10/244,609, which was incorporated by reference above, the safety system continues to monitor the alarm thresholds, as a part of a separate sub-routine (or sub-system), in order to enact a termination of the trial, which may still be necessary if the alarm recovery sequence was not effective.

Moreover, it should again be noted that an alarm recovery sequence is advantageously interruptible by some other alarm recovery sequence that has a respective alarm interrupt with a higher priority than the currently executing alarm recovery sequence.

As described above, the role of the safety system is to monitor the process and operating parameters and initiate a respective alarm recovery sequence if one of a number of pre-programmed alarm thresholds is crossed during a trial. Emergency shutdown of the testing system is initiated if the alarm recovery sequence is deemed to have been ineffective.

Figure 5:
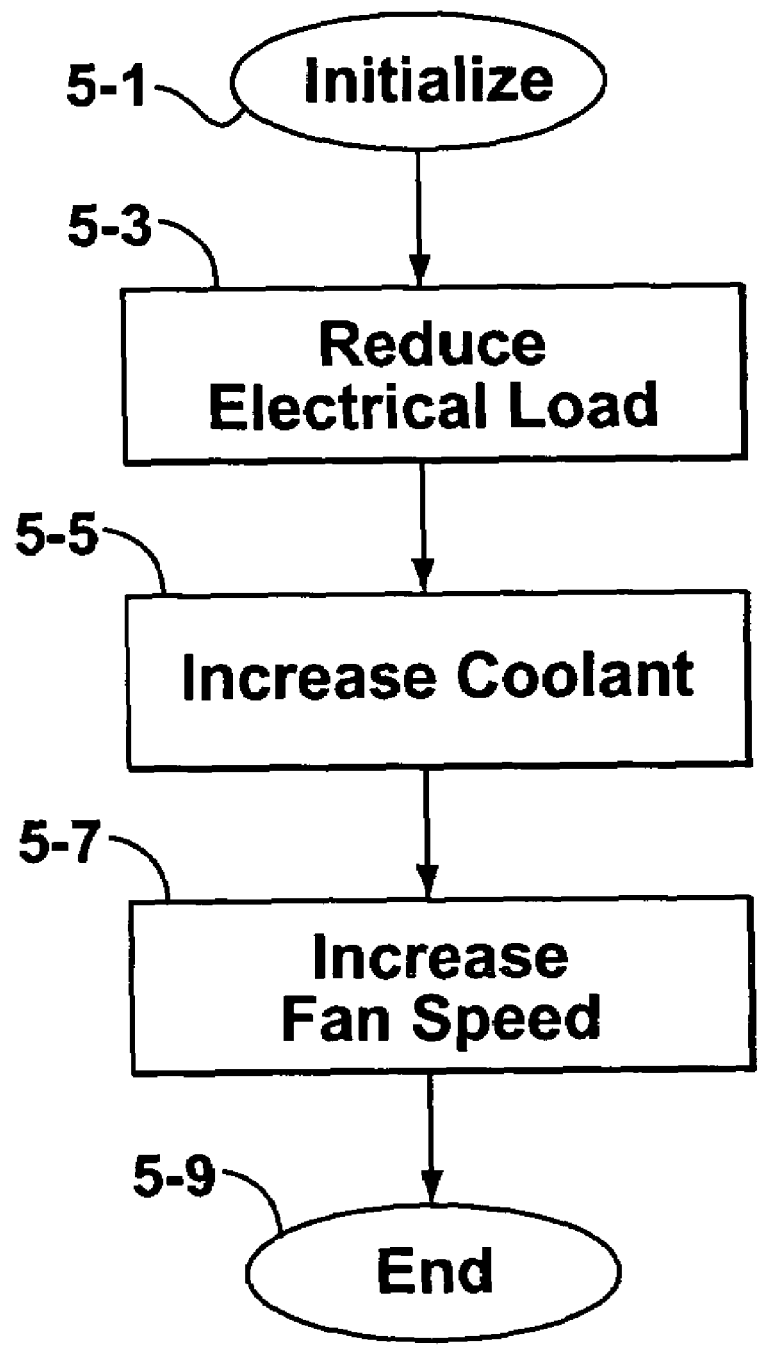
FIG. 5 is a flow chart depicting a very specific example of an alarm recovery sequence in accordance with an embodiment of the invention.

For example, an alarm threshold may be violated if the operating temperature of the fuel cell module becomes exceedingly high due to an increased reaction rate caused by an oversupply of fuels into the anode(s) and/or cathode(s) of the constituent fuel cell(s). Referring now to FIG. 5, illustrated is a flow chart depicting a very specific example of an alarm recovery sequence that may be initiated in response to the violation of the aforementioned alarm threshold associated with over heating of a fuel cell module under test. Those skilled in the art would appreciate that numerous other alarm recovery sequences could be provided for the aforementioned alarm threshold and/or numerous other alarm thresholds provided to ensure the safe operation of a fuel cell under test.

Starting at step 5-1, the alarm recovery sequence is initiated by a modified safety system provided by an embodiment of the invention. In this step, control of regulating devices provided in a testing system is transferred to the alarm recovery sequence. At step 5-3 an electrical load provided by a loadbox is reduced so as to reduce the amount of current required. Subsequently, at step 5-5 the temperature of incoming coolant is decreased, and, then at step 5-7, the speed of cooling fans or pumps within the testing system and/or the fuel cell is turned up to provide additional heat dissipation. Finally, at step 5-9 the alarm recovery sequence ends and control of the regulating devices is transferred from the alarm recovery sequence. For example, in a PEM fuel cell, the active membrane is sensitive to temperature. Thus, a final alarm threshold could be set for a maximum normal operating temperature. If this is exceeded, the steps of FIG. 5 are initiated. If these fail to bring the temperature down, and the temperature rises above a second, higher threshold, indicative of possible or incipient damage to the membrane, then the fuel cell stack is shut down, so as (i) to prevent damage to the membrane and (ii), recognizing that damage may have occurred, to enable the fuel cell stack to be checked before restarting the test.

In some embodiments a computer readable code means is provided having instructions for transferring control of regulating devices to and from an alarm recovery sequence initiated by a modified safety program provided by an embodiment of the invention. However, it should be noted that, in general, the safety program retains an override control over such controls regardless of whether an alarm recovery sequence is executing or an application program is executing.

Numerous modifications and variations of the present invention are possible in light of the above teachings. It is therefore to be understood that within the scope of the appended claims, the invention may be practiced otherwise than as specifically described herein. For example, in some embodiments, depending upon the specific alarm threshold, an alarm threshold may have multiple levels. For example there may be a first and a second level related to a particular alarm threshold. In such a situation a corresponding alarm recovery script may be called after the violation of the first level and a second set of actions may occur after the violation of the second level. The second set of actions may include the initialization of a second alarm recovery sequence or simply result in the termination of a trial.

I claim:

1. A fuel cell testing system comprising:
   a safety system for monitoring at least one process and operating parameter during a fuel cell testing trial and evaluating whether at least one alarm threshold has been violated by the at least one process and operating parameter;
   a computer usable medium having computer readable code means embodied therein for causing the safety system to suspend the fuel cell testing trial when said at least one alarm threshold has been violated and subsequently to initiate a corresponding alarm recovery sequence for a violated alarm threshold; and
   instructions for recording and evaluating measured process and operating parameters in order to determine whether said at least one alarm threshold has been violated.

2. A fuel cell testing system according to claim 1, further comprising a number of sensors, and wherein the computer readable code means comprises:
   instructions for polling the sensors to measure the at least one process and operating parameter; and
   instructions for evaluating whether or not any one of the alarm thresholds have been violated.

3. A fuel cell testing system according to claim 2, wherein the computer readable code means further comprises:
   instructions for suspending the fuel cell testing trial when any one of the alarm threshold has been violated; and
   instructions for initiating the corresponding alarm recovery sequence for the violated alarm threshold.

4. A fuel cell testing system according to claim 2, wherein the computer readable code means further comprises:
   instructions for generating an alarm flag with a respective priority corresponding to the violated alarm threshold.

5. A fuel cell testing system according to claim 2, wherein the computer readable code means further comprises:
   instructions for generating an alarm flag with a respective priority for each alarm threshold that is violated.

6. A fuel cell testing system according to claim 2, wherein the computer readable code means further comprises:

instructions for suspending the fuel cell testing trial after at least one alarm flag with a respective priority is generated; and instructions for initiating a corresponding alarm recovery sequence for the alarm flag.

7. A fuel cell testing system according to claim 6, wherein the computer readable code means further comprises:

instructions for suspending one of the fuel cell testing trial and an executing alarm recovery sequence if at least one other alarm flag, with a higher priority than the alarm flag corresponding to the executing alarm recovery sequence, is generated; and instructions for initiating the corresponding alarm recovery sequence for the at least one other alarm flag.

8. A fuel cell testing system according to claim 2, wherein the computer readable code means further comprises:

instructions for generating an alarm interrupt with a respective priority for each alarm threshold that is violated.

9. A fuel cell testing system according to claim 8, wherein the computer readable code means further comprises:

instructions for suspending the fuel cell testing trial after at least one alarm interrupt with a respective priority is generated; and instructions for initiating a corresponding alarm recovery sequence for the alarm interrupt.

10. A fuel cell testing system according to claim 9, wherein the computer readable code means further comprises:

instructions for suspending one of the fuel cell testing trial and an executing alarm recovery sequence if at least one other alarm interrupt, with a higher priority than the alarm interrupt corresponding to the executing alarm recovery sequence, is generated; and instructions for initiating the corresponding alarm recovery sequence for the at least one other alarm interrupt.

11. A fuel cell testing system according to claim 1, wherein the computer readable code means further comprises:

instructions for determining whether or not an executing alarm recovery sequence was effective; and if the alarm recovery sequence is determined to have been not effective, the computer usable medium having computer readable code means embodied therein for causing the safety system to initiate an emergency shutdown of the fuel cell testing trial; alternatively, if the alarm recovery sequence is determined to have been effective, the computer usable medium having computer readable code means embodied therein for causing the safety system to restart the suspended fuel cell testing trial.

12. A fuel cell testing system according to claim 1, wherein the computer readable code means further comprising:

instructions for allowing an executing alarm recovery sequence to be interrupted and suspended if an alarm threshold having a higher priority is violated; and instructions for initiating another alarm recovery sequence corresponding to the violated alarm threshold with the higher priority.

13. A fuel cell testing system according to claim 12, wherein the computer readable code means further comprises:

instructions for determining whether or not an executing alarm recovery sequence was effective; and if the alarm recovery sequence is determined to have been not effective, the computer usable medium having computer readable code means embodied therein for causing the safety system to initiate an emergency shutdown of the fuel cell testing trial; alternatively, if the alarm recovery sequence is determined to have been effective, the computer usable medium having computer readable code means embodied therein for causing the safety system to restart one of the suspended fuel cell testing trial and the suspended alarm recovery sequence.

14. A fuel cell testing system according to claim 1, wherein the computer readable code means further comprises:

instructions for carrying out sequence steps that make up a particular alarm recovery sequence.

15. A fuel cell testing system according to claim 1 further comprising a number of regulating devices, the computer readable code means further comprising:

instructions for transferring control of the regulating devices to the alarm recovery sequence.

16. A method of controlling a fuel cell testing trial comprising:

measuring at least one process and operating parameter of a fuel cell under test;

evaluating the at least one process and operating parameter to determine whether at least one alarm threshold has been violated by said at least one process and operating parameter;

suspending the fuel cell testing trial if at least one alarm threshold has been violated; and initiating an alarm recovery sequence.

17. A method according to claim 16 further comprising:

determining whether or not the alarm recovery sequence was effective; and if the alarm recovery sequence was not effective, terminating the fuel cell testing trial; alternatively, if the alarm recovery sequence was effective, restarting the suspended fuel cell testing trial.

18. A method according to claim 16 further comprising:

generating an alarm flag with a respective priority for each violated alarm threshold.

19. A method according to claim 18 further comprising:

processing alarm flags in order of priority.

20. A method according to claim 16 further comprising:

generating an alarm interrupt with a respective priority for each violated alarm threshold.

21. A method according to claim 20 further comprising:

processing alarm interrupts in order of priority.

22. A method according to claim 21 further comprising:

suspending an executing alarm recovery sequence if an another alarm threshold having a higher priority is violated; and initiating another alarm recovery sequence corresponding to the another violated alarm threshold.

23. A method according to claim 22 further comprising:

determining whether or not the another alarm recovery sequence was effective; and if the another alarm recovery sequence was not effective, terminating the fuel cell testing trial; alternatively, if the another alarm recovery sequence was effective, restarting one of the suspended fuel cell testing trial and the suspended alarm recovery sequence.

* * * * *